United States Patent [19]

Kägi et al.

[11] Patent Number: 5,656,700

[45] Date of Patent: Aug. 12, 1997

[54] PROCESS FOR PREPARING LINEAR COPOLYESTERS CONTAINING OMEGA-HYDROXYCARBOXYLIC ACID UNITS

[75] Inventors: Werner Kägi, Domat/EMS; Klaus Nothhelfer, Thusis; Werner Stibal, Trimmis, all of Switzerland

[73] Assignee: EMS—INVENTA AG, Zurich, Switzerland

[21] Appl. No.: 516,177

[22] Filed: Aug. 17, 1995

[30] Foreign Application Priority Data

Aug. 19, 1994 [DE] Germany .................. 44 29 524.3

[51] Int. Cl.$^6$ .................................. C08G 63/91

[52] U.S. Cl. .............. 525/437; 528/300; 528/361; 528/354; 528/503; 525/53; 525/439; 525/450; 428/364

[58] Field of Search ................. 528/300, 361, 528/354, 503; 525/437, 439, 450, 53; 428/364

[56] References Cited

U.S. PATENT DOCUMENTS

| 4,584,353 | 4/1986 | Kobayashi et al. ........... 525/438 |
| 4,680,345 | 7/1987 | Kobayashi et al. |
| 5,225,497 | 7/1993 | Ishii et al. .................... 525/437 |

FOREIGN PATENT DOCUMENTS

| 0041035 | 5/1981 | European Pat. Off. |
| 0422282 | 10/1989 | European Pat. Off. |
| 4039857 | 12/1990 | Germany . |
| 4131362 | 9/1991 | Germany . |

OTHER PUBLICATIONS

Derwent Info. 1994, Derwent Abstract No. AN 94–238850 J 06172507, Polyester Copolymer With Improved Thermal Resistance—Prep D. From ARO Matic Polyester With Diol And Acidic Component e.g. Ethylene Glycol And . . . .
Derwent Info. 1994, Derwent Abstract No. AN 93–121484 J 050 59192, Elastic Polyester Films And Sheets—Comprise Crystalline Aromatic Polyester Addn. Polymerised Continuously With Lactone CPD. And Continuously . . . .

(List continued on next page.)

*Primary Examiner*—Samuel A. Acquah
*Attorney, Agent, or Firm*—Browdy and Neimark

[57] ABSTRACT

A process for preparing linear copolyesters which contain omega-hydrocarboxylic acid units, from polyesters that contain at least 90 mol % polyethylene terephthalate units, as well as the usual amount of diethylene glycol units and possibly the known catalysts and stabilizers, includes adding to the already prepared polyester melt at least one compound of the group of lactones, optionally along with further additives but without additional catalysts in a system sealed off from gas exchange and at a higher pressure than the lactone vapor pressure in a proportion of up to 10 mol %, referred to the final melt, and mixed intensively with the melt. The resultant copolyesters, after a total dwell time of less than 30 minutes and a temperature in the range of 265° to 310° C., are further processed or discharged, granulated and subsequently further processed, wherein the copolyesters are identical in viscosity to the starting polyesters and contain randomly distributed omega-hydroxycarboxylic acid units in the polymer chains and whereby the sealed system is a pipe which is under pressure and is provided with a dosing opening and with a mixer downstream of the dosing opening.

20 Claims, 1 Drawing Sheet

OTHER PUBLICATIONS

Derwent Info. 1995, Derwent Abstract No. AN 90–159117, J 02099555, Highly Crystalline Polyethylene Terephthalate Resin Compsns.–Comprise Ethylene Terephthalate–Beta–Methy Delta Valerolactone Copolymer And . . . .

Derwent Abstract No. 90–159116 J 02099554, Highly Crystalline Polyethylene Terephthalate Resin Compsn.–Comprises Pet Contg. Epsilon–Caprolactone As Co–Monomer Component And Crystallisation Accelerators.

Derwent Abstract No. AN 90–152364 J 02097519, Highly Crystalline Polyester Copolymer–Comprises Pet Resin Contg. 0.1–5 wt. Per Centof Units Derived From Beta–M-ethyl–Delta–Valerolactone.

Derwent Info. 1994, Derwent Abstract No. 90–152365, J 02097520, Highly Crystalline Polyester Copolymer For Fibres, etc Comprises Reaction Prod. Of Terephthalic Acid, Ethylene Glycol And Epsilon Caprolactone.

Derwent Info. 1994, Derwent Abstract No. AN 85–078330, J 60031525, High Viscosity Polyester Type Block Copolymer mfr.–By Polymerising Polyester Block Copolymer Obtd. By Reacting Crystalline Aromatic Polyester With Lactone.

Derwent Info. 1994, Derwent Abstract No. AN 84–259558, J 59157117, Modification Of Crystalline Aromatic Polyester–By Reacting The Polyester With Lactone (s) At Specific wt. Ratio, Useful For Films, Sheets, Vessels Etc.

PROCESS FOR PREPARING LINEAR COPOLYESTERS CONTAINING OMEGA-HYDROXYCARBOXYLIC ACID UNITS

FIELD OF INVENTION

The invention relates to a process for preparing linear copolyesters (COPET), which contain omega-hydrocarboxylic acid units, from polyethylene terephthalate; to the resultant copolyesters; and to their use for preparing hollow bodies, especially bottles and containers, but also for producing COPET fibers and filaments.

BACKGROUND

While practically only homo-polyethylene terephthalate (PET) is used to produce polyester fibers and filaments, virtually exclusively PET-based copolyesters (COPET) that are modified with from 2 to 5 and sometimes up to 7 mol % of cocomponents are now used to make PET bottles for carbonated sweetened beverages and the like.

The resultant advantages at lower processing temperatures, because of lower melting points, are a low acetaldehyde content and glass-clear transparency, because of a lower crystallization rate. Known cocomponents include comonomers of the compound classes of dicarboxylic acids (or methyl esters thereof), diols, and oxycarboxylic acids.

For bottle grade COPET, isophthalic acid, naphthalene-2,6-dicarboxylic acid, 1,4-cyclohexanedimethanol and diethylene glycol, which also forms in small quantities in homo-PET production in situ, are preferably used (for instance, see European Patent Disclosure EP-0 041 035). These comonomers are added to the two main components, that is, terephthalic acid or dimethylterephthalate and ethylene glycol, at the beginning of the production process, or in other words upon esterification or transesterification. Adding them at the end of PET production leads to a drastic decrease in viscosity which makes processing questionable. Hence in the prior art, PET granulates for bottles and for textile applications have not been able to be produced simultaneously in the same esterification and polycondensation equipment, even though the problem of how to later deluster PET melts for textile purposes has now been solved (German Patent DE40 39 857 C2).

The prior art provides various points of departure for producing copolyesters from PET melts, but the object of producing a lower-melting linear, i.e. unbranched, statistical or random-distribution copolyester with simple equipment, rapidly, and without changing the intrinsic viscosity (I.V.) has not been attained at all or at most only partly. (The I.V. is a conventional standard number for the molecular weight for bottle polyesters.)

In European Patent Disclosure EP-0 422 282 A1, a process is described in which the dianhydride of an aromatic tetracarboxylic acid, preferably pyromellitic acid dianhydride, is metered into a PET melt and worked in. The resultant granulate is distinguished primarily by a very rapid increase in I.V. in solid phase polycondensation at even relatively low temperatures, because the substance added links the polymer chains in an additional polyaddition reaction. The result in principle is a copolyester; because the quantity of pyromellitic acid anhydride, 0.6 weight %, is optimal in view of post condensation, the influence on the melting point is only 2° C., as long as isophthalic acid is not additionally employed as a cocomponent in the starting material for the process.

Finally, the dianhydride also has the side effect that the second carboxyl groups liberated after the addition reaction to the anhydride groupings can at least sometimes lead to branching in a subsequent reaction. As a result, although the so-called melt strength in extrusion blow molding is increased, nevertheless at the same time the flow properties are worsened.

In the process according to German Patent Disclosure DE 41 31 362 A1, the usual dicarboxylic acids and diols are used as cocomponents, specifically in the form of a low-viscosity pre-copolymer with a high proportion of comonomer, which is mixed with homo-PET melt. In this process, to produce the prepolymer, one or two additional reactors and also a mixing extruder for mixing the prepolymer with the homopolyester are required. After the preferred melt mixing time of 5 to 15 minutes, there is still no copolyester present in this process, but rather only a physical polymer mixture for granulation, which still has virtually the same high melting point as the homo-PET. The copolyester, not formed until the solid phase post condensation, is still not entirely statistical, because its melting point is up to 2° C. higher than the melting temperature of conventionally prepared, genuinely statistical copolyesters of the same compositions. The explanation for the copolymer formation mechanism in this process can be found on page 3, lines 44–51 of this document: first, after a sufficiently long melt dwell time, only block copolyesters form, which during the post condensation approach closer to a random cocomponent distribution in the molecule chains, the lower the molecular weight of the admixed copolyesters with the comonomer. A further disadvantage of this process is that there is a lower limit to the I.V. value and hence to the molecular weight of the comonomer-copolyester, which is dictated by the economy of the entire process, because the polymer mixture is reduced in its I.V. value compared with the homo-PET.

U.S. Pat. No. 4,680,345 describes a process with which elastic polyesters can be made, by continuously carrying out a polyaddition reaction in a reaction vessel between melted aromatic polyesters, especially polybutylene terephthalate, and lactones in relatively large proportional quantities. The reaction conditions given are a temperature range of 210° to 260° C. and a reaction time of 30 minutes to 6 hours. The result is a block copolymer with soft segments of polylactone, which lend elasticity, and hard crystalline segments of the aromatic polyester. Besides the disadvantage of the long reaction time, the difficulty in this process is that gas cushions of unreacted lactone vapor form in the upper part of the reactor, and if additional provisions are not taken (positioning the reactor vertically or obliquely or incorporating gas baffles), problems occur and the quality becomes worse.

Reactions between polyester and lactones are also described in the following eight references:

In the Derwent Abstract No. AN 94-238850, J 061 72507 is cited describing an elastomeric copolyester with improved heat resistance obtained by reacting an aromatic polyester with a lactone compound, wherein a diol component of the aromatic polyester has a special formula. Nothing in particular is stated regarding the production method, and such a copolymer combination would not be suitable for producing bottles.

In the Derwent Abstract No. AN 93-121484, J 050 59192 is cited describing a continuous production method for elastic polyester films and sheets. Here, aromatic crystalline polyesters are continuously subjected to an addition-polymerisation in a double-screw extruder with lactone compounds from which sheets are directly formed after a short retention time of maximally 30 minutes at maximally 280° C. However, the advantage of the high quality of the sheets must be "paid for" by the use of a very expensive machine, which is used as the reactor and for devolatizing unreacted lactone. Furthermore, in the course of this method additional tin or phosphorous catalysts are preferably added to the polyester which, however, would not permit a use of the resultant films or sheets in the field of food packaging. Furthermore, under the conditions recited in the exemplary embodiments no statistical, but instead block copolyesters (hard blocks of aromatic polyesters and soft polylactone blocks), are created. This is clear from the ratio between the amount of caprolactone and the relatively small melting point decrease of the polyester, which correlates with the elastic properties.

In the Derwent Abstract No. AN 90-159117, J 020 99555 is cited describing copolyester on a PET basis with up to 5 weight-percent of beta-methyl-delta-valerolactone (MVL) as the comonomer and up to 50 weight-percent of crystallization accelerator. Production takes place conventionally by esterification and polycondensation (with ring opening polymerisation of the lactone during polycondensation), and it is used for highly crystalline injection-molded pieces showing no transparency.

In the Derwent Abstract No. AN 90-159116, J 020 99554 is cited describing a copolyester which is analogous to the one disclosed in J 020 99555 with the sole difference being that in place of MVL up to 2 weight-percent ε-caprolactone is used.

In the Derwent Abstract No. AN 90-152364, J 020 97519 is cited describing copolyesters which mainly contain terephthalic acid and ethylene glycol as well as up to 5 weight-percent of MVL Manufacture takes place conventionally and fibers, films and bottles are named as applications.

In Derwent Abstract No. AN 90-152365, J 020 97520 is cited describing copolyesters analogous to J 020 97519 with the sole difference that in place of MVL up to 2 weight-percent of ε-caprolactone are incorporated during polymerisation.

In Derwent Abstract No. AN 85-078330, J 600 31525 is cited describing a highly viscous block copolyester which is created in the solid phase by a reaction between a homopolyester (for example PET) and a lactone (for example ε-caprolactone). Such block copolyesters still have a high melting point which is similar to the homopolyester and therefore do not permit lower processing temperatures, such as would be necessary for bottle production.

In Derwent Abstract No. AN 84-259558, J 591 57117 is cited describing a modification of a crystalline aromatic polyester (for example PET or PEN=polyethylene naphthalate) with 2 to 5 weight-% of lactone, for example ε-caprolactone, by reaction at 180° to 260° C. in the presence of an organic tin, aluminium or titanium catalyst with the optional use of a solvent. The properties resulting therefrom make the polyester suitable for films, sheets and vessels.

SUMMARY OF INVENTION

An object of the present invention is therefore to furnish a lower-melting linear copolyester of the same viscosity (I.V.) simply and rapidly, without the disadvantages of the prior art, from a homo-PET melt.

This object is attained by a process characterized in that to the already prepared polyester melt at least one compound of the group of lactones, optionally along with further additives but without additional catalysts, is added in a system sealed off from gas exchange and at a higher pressure than the lactone vapor pressure, in a proportion of up to 10 mol % based on the final melt, and mixed intensively with the melt, and the resultant copolyesters, after a total dwell time of less than 30 minutes and a temperature in the range of 265° to 310° C., are further processed or discharged, granulated and subsequently further processed, and wherein the resultant copolyesters are identical in viscosity to the starting polyesters and contain randomly distributed omega-hydroxycarboxylic acid units in the polymer chains. The sealed system is desirably a pipe which is under pressure and is provided with a dosing opening and with a mixer downstream of the dosing opening.

More generally, it has proven possible to attain this object with the present invention, by mixing comonomers in the form of compounds from the substance class of lactones, preferably epsilon-caprolactone, in pure monomer form, into the PET melt, and reacting them in a system sealed off from gas exchange under pressure. Unexpectedly, after some minutes—and without requiring either a reactor or an extruder in the area of lactone metering, providing mixing and reaction, a linear, mostly converted, statistical copolyester with a reduced melting point forms in the melt. The fact that the intrinsic viscosity remains practically constant, if the lactone used is water-free, is also unexpected. The results are all the more unobvious because the literature teaches that polylactones tend to decompose at temperatures of over 200° C. (see R. D. Lundberg et al., Journal of Polymer Science, Part A-1, Vol. 7, 1969, the paragraph spanning page 2928–2929), while the temperature of a PET melt is over 260° C.

Although the reaction between polyester and lactones as well as the lacton-copolyester resulting therefrom was previously known in principle, it was surprising and not foreseeable to arrive at a statistical copolyester with this method, which uses very simple apparatus and without the need for additional catalysts, which following a later postcondensation, is suitable for producing bottles for beverages, In particular, the process of the invention now includes the steps of metering and mixing up to 10 mol %, based on the finished composition, of a compound from the group of lactones, and selectively further additives, into a melt which comprises a polyester with at least 90 mol % polyethylene terephthalate units. Next, after a sufficiently long dwell time, which is typically dictated by the apparatus used and which is less than 30 minutes, preferably maximum 20 minutes, the melt is further processed, or discharged, granulated and then further processed.

A preferred partial step in the further processing is a solid phase polycondensation, which raises the molecular weight of the copolyester and also lowers the acetaldehyde content. This is preceded by the crystallization and drying of the granulate. The shaping into molded bodies, preferably hollow bodies or preforms for them, forms the final step in the process. Another preferred way of further processing the melt of the copolyester of the invention is to spin it into fibers and filaments.

The process according to the invention, with very short reaction times for the addition of lactones, which have a ring structure and preferably 6 to 12 carbon atoms, into the polyester chain has substantial advantages over other kinds of modification. The addition does not produce any split-off by-products which require removal.

Thus the reaction system, which is sealed off from gas exchange and is at a pressure higher than the lactone vapor pressure, can be a simple tube through which the melt passes and which is provided with a downstream mixing device. Dynamic mixers and preferably static mixers can be used. It is very particularly advantageous, however, that the reaction time is short enough that the process according to the invention can be carried out after an existing production process, such as for conventional polyethylene terephthalate, for instance only in part of the melt stream, with no attendant disadvantage.

The fact that the viscosity is unaffected despite the lower melting point is of great significance for the mechanical properties of both the melt and the molded parts for which the copolyesters according to the present invention are particularly advantageous.

The lower melting point of the copolyesters of the invention depends on the metered quantity of lactone added, which is used at a maximum of 10 mol %, advantageously 0.5 to 8 mol % and preferably 1 to 6 mol %, and especially preferably 2 to 5 mol %. This allows processing of the copolyesters at lower temperatures, which advantageously lessens the formation of acetaldehyde.

For process reasons, polyethylene terephthalate as a rule contains small amounts of diethylene glycol as chain building units, which can also be considered to be comonomers. The process of the present invention allows the use of polyesters that contain up to 5 mol % diethylene glycol. It is essential merely that the total quantity of comonomers advantageously be no more than 10 mol %.

BRIEF DESCRIPTION OF DRAWING

The process according to the invention is described in further detail below, documented by examples, and taken in conjunction with the drawing, wherein.

DETAILED DESCRIPTION OF EMBODIMENTS

Figure 1:
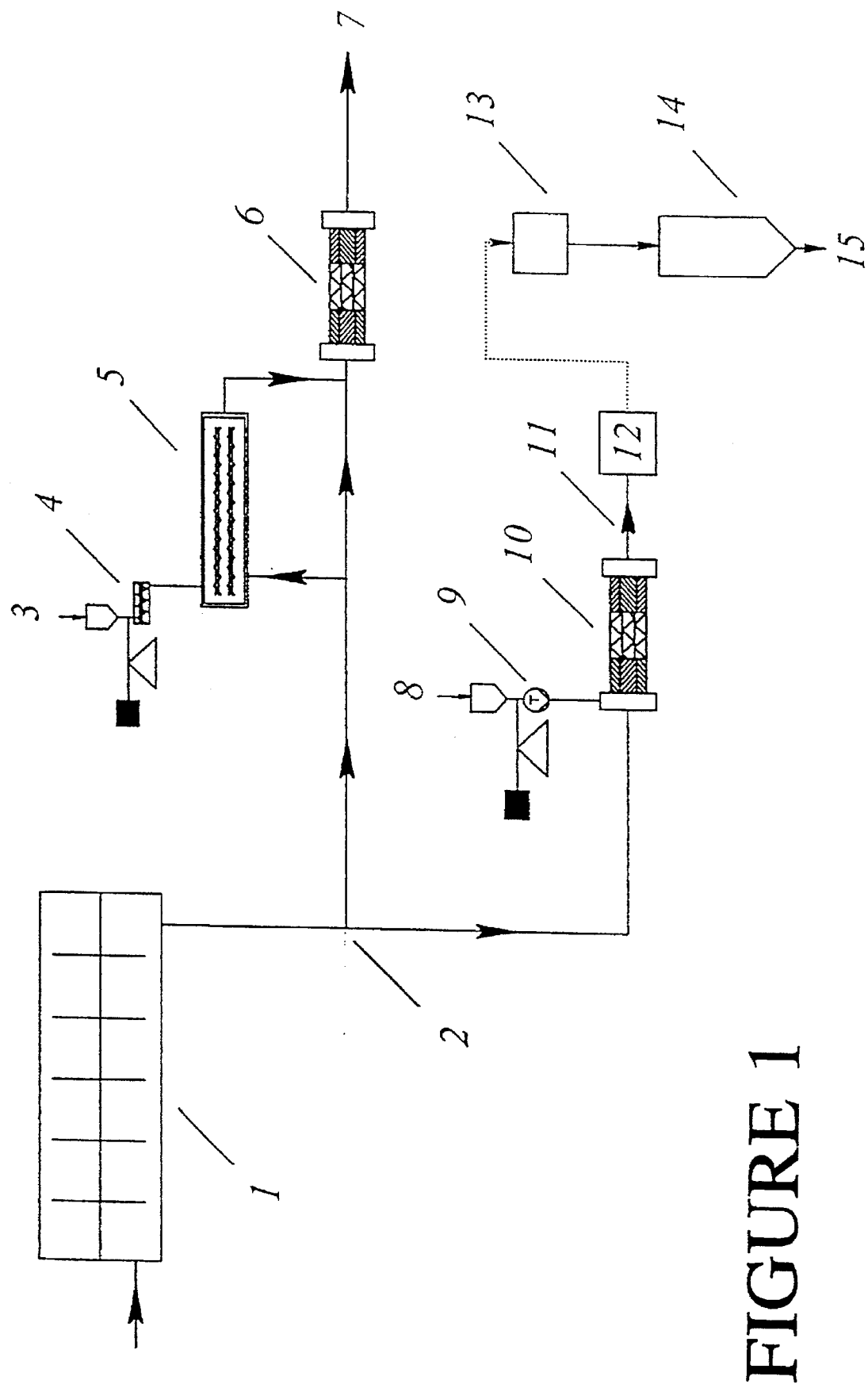
FIG. 1, the sole figure, is a schematic flow diagram showing the manufacture of integrated COPET according to the present invention.

In the process according to the invention, the liquid lactone is preferably metered into a sealed system, for instance a pipeline through which the melt flows and in which a static mixer assures the distribution of the lactone in the PET melt. Reactors and/or extruders are not necessary in this process in the area of lactone metering, mixing and reaction.

The requisite melt dwell time for the reaction of the lactone, from the moment it is added to the PET melt until discharge, is less than 30 minutes, preferably maximum 20 minutes.

A rest monomer portion which usually remains after this dwell time even after good mixing is completely reacted in a subsequent postcondensation. For this reason the additional admixture of a further catalyst, besides the one already present in the PET, is not necessary, which prevents toxicological problems when the COPET of the present invention is used as food packaging, and thus represents an advantage of the process of the invention.

As a PET melt, polyethylene terephthalate is preferably used, with the usual content for preparation purposes of diethylene glycol units and the familiar catalysts and stabilizers. As further additives, of the kind named in German patent DE 27 15 932 C2, for example, usage-dictated additives are employed. Those known from the prior art for purposes of color regulation are preferred. The intrinsic viscosity is preferably in the range from 0.5 to 0.8 deciliters per gram (dl/g) and as a rule is equivalent to textile viscosity. Because an overriding design for a plant that is flexible and economical can incorporate the process of the invention, a different part of the same PET melt stream can advantageously be used, after later delustering, for making fibers or filaments. The temperature of the PET melt is in the range from 265° to 310° C., and preferably between 270° and 295° C. The pressure is above the lactone vapor pressure.

In the case of using ε-caprolactone as the lactone, the vapor pressure can be approximately expressed as a function of the temperature by means of the equation $$P = 4.6087 \times 10^5 \times \exp[-6581/(\Theta + 273.15)]$$

with p=vapor pressure, expressed in bar (absolute), and Θ=temperature, expressed in °C.

The amorphous raw copolyester granulate obtained by the process of the invention is preferably crystallized, by the methods known for bottle granulates, and brought to higher intrinsic viscosity and lower acetaldehyde content by solid phase polycondensation; this makes it into finished (bottle grade) bottle granulate, and in that form it is then processed into preforms and bottles, for instance.

The quantity of lactone is chosen such that the reduced melting point desired for producing bottles or preforms is attained. This is most advantageously accomplished by adding 2 to 5 mol % lactone, because the influence on the lowering of the melting point is about the same as with the conventional comonomers, or in other words about 2° C. per mol %. For special requirements, such as impeccable clarity and transparency even in very thick-walled preforms, higher concentrations may be necessary, up to a maximum of 10 mol % of the lactone.

The following examples, offered illustratively and not by way of limitation, serve to illustrate and reinforce the invention.

EXAMPLE 1 (PRELIMINARY)

The starting material was a pigment-free amorphous PET granulate with the following material properties:

—intrinsic viscosity (I.V.) 0.663 dl/g

The intrinsic viscosity was determined by measuring the relative solvent viscosity R.V. in a solvent mixture consisting of equal proportions by mass of phenol and 1,1',2,2'-tetrachloroethane. Recalculation to find the I.V. was done using Huggins's equation, in which $K_H = 0.35$:

$$I.V. = \frac{\sqrt{1 + 4K_H(R.V. - 1)} - 1}{2K_H - C} = \frac{\sqrt{1 + 1.4(R.V. - 1)} - 1}{0.35} \quad (dl/g)$$

Melting points measured with a DSC-heating rate of 20° C./min are about 3° C. lower compared to a heating rate of 10° C./min.

diethylene glycol content 2.0 mol %
antimony content (as $Sb_2O_3$) 250 ppm Sb
phosphorus content (as $H_3PO_4$) 11 ppm P This granulate was crystallized and dried and then fed to a single-screw melting extruder, to produce a melt whose melt pressure was 100 bar. The course of the melt was then directed through a heated pipe, in which a gear pump was installed, to a molding head at which a pressure of 50 bar was measured and where two melt strands could be extruded, cooled in water, and granulated. The temperature was adjusted to 290° C.

As the comonomer, monomeric epsilon-caprolactone made by Interox Chemicals Ltd. was used. This compound, which is liquid at room temperature, was fed with a metering pump into the granulate inlet adapter of the extruder, where the caprolactone consequently mixed with the molten PET without revolatilizing, and began to react therewith. The steps to obtain the results of the first tests are therefore similar to the disclosure of the most relevant prior art: e.g. J 050 59192.

The metered quantity of caprolactone was adjusted to 5 mol %, which means that there were 5 lactone units per 95 terephthalate units in the modified polyester. At the maximum capacity of the metering pump (2000 ml/h) and at a total throughput of 71.2 kg/h, the resultant dwell time was 10 minutes, calculated from the granulate charging inlet to the molding head (the effective melt dwell time was estimated at approximately 9 minutes). The melt strands that emerged were clean, homogeneous, and bubble- and vapor-free.

Analysis of the thus-produced, modified granulate unexpectedly showed that the intrinsic viscosity had remained virtually constant (I.V.=0.642 dl/g), aside from a slight hydrolytic decomposition resulting from a small amount of residual moisture in the starting granulate, but that the melting point had dropped to 244.3° C., or in other words by 1.88° C./mol %. This proved that the caprolactone had in fact been incorporated into the molecule chains and had formed a statistical or random copolyester.

EXAMPLE 2 (PRELIMINARY)

Using the same starting granulate as in Example 1, an analogous experiment was performed with gamma-butyrolactone (procured from Fluka Chemie AG), which is also liquid at room temperature. The metered amount was again 5 mol %. The melt strands emerging from the molding head were relatively highly volatile, however, and it was not possible to lessen this substantially even by prolonging the dwell time (reducing the throughput). A sample taken after a melt dwell time of approximately 20 minutes had a melting point of 251.7° C. This slight drop in melting point of 2° C. supports the conclusion that while the butyrolactone is not entirely inert, nevertheless evidently only about 20% of the quantity used (approximately 1 mol %) reacted, and therefore gamma-butyrolactone is not very suitable, because of its low reactivity.

By comparison, because of their less-stable rings, the lactones from the homogeneous series from epsilon-caprolactone upwards—that is (besides of ε-caprolactone), lactone-7, lactone-8, lactone-9, lactone-10, lactone-11 and laurin-lactone—are especially suitable for the melt modification process according to the invention (the number assigned to each lactone indicates the number of carbon atoms in the ring molecule).

EXAMPLE 3 (PRELIMINARY)

One example of the aromatic lactones is phthalide. Its melting point is 75° C. Although its reactivity is slight, it can serve as an example for those lactones that would have to be molten before being metered in liquid form. A DSC measurement showed a melt enthalpy of 147 J/g. A laboratory experiment in which the phthalide was held in the liquid phase for 3 hours at 85° C. under nitrogen showed no change in color or melting point, so that from the standpoint of material behavior, it would be possible to include a lactone melting stage in the process.

EXAMPLE 4

In a preferred embodiment according to the invention, a static mixer, comprising 13 SMX mixer elements made by Sulzer, with a small tube in the inlet flange for injecting liquid additives, was built into the melt line between the melting extruder and the gear pump.

With this apparatus, 4 mol % of epsilon-caprolactone was metered into the PET melt. At this mixture ratio, with the 13 SMX mixer elements, a mixing quality σ/x (variation coefficient) of approximately 0.01 was theoretically attained (according to Sulzer mixing quality diagrams). A variation coefficient of 0.05, which is equivalent to about 10 mixing elements, is already considered to be practically fully homogeneous. Since the physical distribution was followed by blending as a result of the chemical reaction (transesterification), the homogeneity in the end was in fact even better.

The experiment was conducted at a melt temperature of 290° C. and at a total throughput of 70 kg/h (epsilon-caprolactone quantity=1567 ml/h), beginning with the same PET granulate as in Example 1. The melt dwell time from charging of the static mixer until the molding head was 10 minutes. The melt pressure upstream of the molding head was 50 bar.

The intrinsic viscosity of a sample taken prior to the onset of caprolactone metering was 0.653 dl/g, and that of the caprolactone copolyester was 0.655 dl/g, or in other words practically the same. The melting point of the COPET granulate was 246.3° C. Thus, the molar effect on the melting point was 1.85° C./mol %, or in other words nearly the same as in Example 1, which is further evidence that the epsilon-caprolactone was converted to a great extent.

An analysis of the amorphous granulate revealed that about 95% of the used caprolactone was chemically incorporated into the polyester chains, and about 5% was present in free, physically bonded form.

EXAMPLE 5 (COMPARATIVE)

As a comparison to the novel melt modification process, a caprolactone COPET was prepared in a conventional manner, in a polyester batch system comprising an esterification and polycondensation reactor.

Four mol % of ε-caprolactone was added at the onset of esterification into the residual material from a prior identical batch in the esterification reactor. From the recipe chosen, the result was the following amorphous COPET granulate:

intrinsic viscosity (I.V.) 0.637 dl/g melting point (DSC, 20° C./min) 247.7° C.

diethylene glycol content 1.3 mol % antimony content (as $Sb_2O_3$) 130 ppm Sb phosphorus content (as $H_3PO_4$) 20 ppm P cobalt content (as $CO(CH_3COO)_2 4H_2O$) 20 ppm Co Even with the conventional use of caprolactone for COPET production, the influence on the melting point was approximately the same as in the process according to the invention. No free caprolactone could be detected. Because of the addition of cobalt acetate, the color of this granulate was slightly bluish.

It is thus clear that linear omega-hydroxycarboxylic acid-modified polyesters with the same properties can also be prepared in autoclaves or by batch processing, although without the benefit of the advantages according to the invention.

EXAMPLE 6

COPET granulate from Example 4 was crystallized in a paddle dryer at 160° C. and then polycondensed in the solid phase in a vacuum tumbling dryer at a product temperature of 210° C. To arrive at an I.V. value of 0.82 dl/g required only 3.5 hours, calculated from a product temperature of 200° C., because of the residual quantity of catalyst from the original PET. Within this short time, the acetaldehyde content was reduced only to 2.8 ppm. After this postcondensation, however, no free caprolactone could be detected any more.

The behavior of the material in further processing was of interest: In a Demag DZ 210-1200/1200 injection molding machine with an 8-cavity tool, from the postcondensed and dried granulate, bottle preforms with a weight of 48 g for 1.5-liter bottles were produced. It was surprising that at an unusually low temperature of 265° C., it was still possible to injection-mold impeccably clear, transparent preforms. A bottle granulate that has already gained market recognition as setting a good standard required injection molding at a temperature 5° C. higher. A special characteristic of the preforms according to the invention was that, viewed in polarized light, no structure in the preform wall could be seen, which makes such polyesters suitable even for thicker-walled preforms for reusable (refillable) bottles wherein cloudiness, resulting from beginning crystallization, poses a problem with normal bottle grade copolymers.

EXAMPLE 7

In the same manner as in Example 6, the COPET granulate of Example 5 was further treated; the effective postcondensation time was 10 hours, and after that time the granulate had an intrinsic viscosity of 0.91 dl/g and an acetaldehyde content of 0.5 ppm. Despite the high viscosity the granulate could still be injection molded into transparent preforms at the normal standard temperature of 270° C. (melt distributor, 280°). Using a Sidel stretch-blowing machine, these preforms were then blown into bottles, which were impeccable in appearance and light lavender-blue in color. The acetaldehyde content in the bottles met the Coca-Cola standard, and in a migration test with water, traces of the physiologically unobjectionable ε-caprolactone could hardly be found, so that nothing should stand in the way of the use of this novel copolyester for beverage bottles.

Based on the present specification and on the possibilities offered by the process of the present invention, a commercially optimal and especially preferred configuration of a large-scale polyester plant for integrated COPET production is shown diagrammatically in FIG. 1. As shown, the system includes a final reactor 1 in continuous polycondensation for a homoPET melt, a branching point 2 leading to textile manufacture in one line and to bottle grade product in the other line. A hopper 3 is provided for the addition of titanium dioxide powder, followed by a metering screw 4 or the like for the metering of titanium dioxide. A double-screw extruder 5 serves to compound the titanium dioxide with a portion of the homoPET and a static mixer 6 serves to blend the remainder of the homoPET with the TiO$_2$/homoPET mixture, after which a delustered homoPET stream 7 for textile use is discharged for direct spinning of fibers or filaments.

Meanwhile, the other homo-PET line passes to a system for the addition of lactone including a lactone reservoir 8, a liquid metering pump 9 and a static mixer 10 in which the mixing and a great extent of the reaction takes place. A mostly converted COPET melt stream 11 passes from the static mixer 10 to a granulation zone containing a granulator. For the thermal treatment of the granules in solid phase, further downstream and part of the SSP system is a crystallization zone 13 followed by a solid phase polycondensation zone 14, from which is discharged at 15 COPET bottle grade granulate.

In the course of metering the lactone, it is advantageous for still other inert additives that are soluble in the lactone, such as melt-soluble colorants, and in particular small amounts of a blue colorant such as a blue toner for color regulation, to be metered into the PET melt.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A process for preparing a random linear copolyester of bottle-grade quality which contains omega-hydroxycarboxylic acid units, from a polyester that contains at least 90 mol % polyethylene terephthalate units and the known catalysts and stabilizers, comprising providing a polyester melt containing at least 90 mol % polyethylene terephthalate units, adding at least one lactone, optionally along with further additives, to said melt but without additional catalysts in a system sealed off from gas exchange and at a higher pressure than the lactone vapor pressure, in an amount sufficient to provide a lowered melting point random linear copolyester and in a proportion of 0.5 to 10 mol % based on the final melt, wherein the sealed system is a pipe which is under pressure and is provided with a dosing opening and with a static mixer downstream of the dosing opening, intensively mixing said lactone with the melt with said static mixer within said pipe, and maintaining a total dwell time in said pipe of less than 30 minutes and a temperature in the range of 265° to 310° C., to produce a copolyester identical in viscosity to the starting polyester and containing randomly distributed omega-hydroxycarboxylic acid units in the polymer chains.

2. The process of claim 1, further comprising, after producing said copolyester, the steps of crystallization, drying, solid phase polycondensation, and the production of molded bodies.

3. The process of claim 1, further comprising, after producing said copolyester, the production of fibers and filaments.

4. The process of claim 1, wherein the lactone added in metered fashion is a lactone having from 6 to 12 carbon atoms.

5. The process of claim 4, wherein said lactone is ε-caprolactone, and wherein the vapor pressure is $$P = 4.6087 \times 10^5 \cdot \exp[-6581/(\Theta + 273.15)]$$

wherein P is the vapor pressure expressed in bar (absolute), and Θ is the temperature expressed in °C.

6. The process of claim 1, wherein the lactone is added in metered fashion in a quantity of from 0.5 to 8 mol %.

7. The process of claim 6 wherein said quantity is 1 to 6 mol %.

8. The process of claim 6 wherein said quantity is 2 to 5 mol %.

9. The process of claim 1, wherein the starting polyester contains up to 5 mol % units of diethylene glycol, and the sum of diethylene glycol units and hydroxycarboxylic acid units does not exceed 10 mol %.

10. The process of claim 1, wherein said dwell time in said pipe is a maximum of 20 minutes, wherein the resultant random linear copolyester has a melting point lowered by substantially 2° C./mol %.

11. The process of claim 1, wherein said temperature is in the range of 270° to 295° C.

12. The process of claim 1, wherein the further additive is a soluble inert blue toner.

13. A process according to claim 1, wherein the lactone added in metered fashion is a lactone having from 6 to 12 carbon atoms and is added in metered fashion in a quantity of from 0.5 to 8 mole %; wherein the starting polyester contains up to 5 mole % units of diethylene glycol, and the sum of diethylene glycol units and hydroxy carboxylic acid units does not exceed 10 mole %; and wherein said dwell time in said pipe is a maximum of twenty minutes and said temperature is in the range 270° to 295° C.

14. The process of claim 13, wherein said quantity is 2 to 5 mole %.

15. Postcondensed linear random copolyester of bottle-grade quality, which contains randomly distributed omega-hydroxycarboxylic acid units, prepared by the process of claim 2.

16. Postcondensed linear random copolyester of bottle-grade quality, which contains randomly distributed omega-hydroxycarboxylic acid units, prepared by the process of claim 13.

17. In a preform for the manufacture of a container by blow-molding, formed of a polyester, the improvement wherein said polyester comprises the random copolyester of claim 2.

18. In a bottle for beverage formed of a polyester by blow-molding, the improvement wherein said polyester comprises the copolyester of claim 2.

19. In an extruded product selected from the group consisting of fibers and filaments, formed of a polyester, the improvement wherein said polyester comprises the random copolyester of claim 3.

20. A process for preparing a random linear copolyester of bottle-grade quality which contains omega-hydroxycarboxylic acid units, from a polyester that contains at least 90 mol % polyethylene terephthalate units and the known catalysts and stabilizers, comprising providing a polyester melt containing at least 90 mol % polyethylene terephthalate units, adding at least one substantially water-free lactone, optionally with further additives, to said melt but without additional catalyst in a system sealed off from gas exchange and at a higher pressure than the lactone vapor pressure, in a proportion of 0.5 to 10 mole % based on the final melt, said sealed system consisting essentially of a pipe maintained under pressure and provided with a dosing opening at an upstream end thereof and a static mixer downstream of said dosing opening, intensively mixing said lactone and said melt with said static mixer within said pipe in the absence of a screw mixer, and maintaining a total dwell time in said pipe of less than 30 minutes and a temperature in the range of 270° to 310° C., to produce a copolyester melt containing randomly distributed omega-hydroxycarboxylic acid units in the polymer chains and having substantially the same viscosity as the starting polyester, and solidifying said copolyester melt and carrying out solid phase polycondensation, and thereby obtaining said random linear copolyester of bottle-grade quality, said random linear copolyester having a lower melting point than the starting polyester as well as an enhanced intrinsic viscosity and an acetaldehyde content sufficiently low to meet beverage bottle standards.

* * * * *